United States Patent [19]

Nishimura et al.

[11] Patent Number: 4,640,393

[45] Date of Patent: Feb. 3, 1987

[54] CONTROL DEVICE FOR VEHICULAR TRANSMISSION

[75] Inventors: Sadanori Nishimura; Noboru Sekine, both of Saitama, Japan

[73] Assignee: Honda Giken Kogyo Kabushiki Kaisha, Tokyo, Japan

[21] Appl. No.: 701,756

[22] Filed: Feb. 14, 1985

[30] Foreign Application Priority Data

Feb. 17, 1984 [JP] Japan ................................ 59-26969

[51] Int. Cl.[4] ............................................. B60K 41/02
[52] U.S. Cl. .............................. 192/0.052; 192/0.076; 74/865; 74/866
[58] Field of Search ................. 192/0.04, 0.052, 0.075, 192/0.076, 0.092, 3.58; 74/861, 864, 865, 866

[56] References Cited

U.S. PATENT DOCUMENTS 4,091,902  5/1978  Hamada ..................... 192/0.052 X
4,170,153 10/1979  Mizuno et al. ................. 74/864 X
4,312,248  1/1982  Sugimoto et al. ................. 74/861
4,324,153  4/1982  Sugimoto et al. ............... 74/861 X
4,480,732 11/1984  Takano ........................ 192/0.076 X

FOREIGN PATENT DOCUMENTS 0046150 4/1981 Japan ............................. 74/861

Primary Examiner—Lawrence Staab
Assistant Examiner—Martin G. Belisario
Attorney, Agent, or Firm—Lyon & Lyon

[57] ABSTRACT

A vehicle transmission having an auxiliary transmission with high and low speeds connected in series with a multi-speed manual transmission and clutch to an engine wherein the auxiliary transmission normally is shifted in response to the throttle opening of the engine and the vehicle speed. A control device detects the actuation of the clutch to maintain the auxiliary transmission in the low speed for a predetermined period after such clutch actuation to improve the vehicle operation.

3 Claims, 7 Drawing Figures

CONTROL DEVICE FOR VEHICULAR TRANSMISSION

The present invention relates to a vehicular transmission of the type in which an auxiliary transmission having high and low speed transmission lines is connected in series to a manual shift type main transmission connected to an engine through a transmission clutch such that it is automatically shifted in accordance with the throttle opening of the engine and the vehicle velocity.

In a vehicular transmission of this type according to the prior art, the high-speed transmission line of the auxiliary transmission is established in response to the sequence of the driving conditions, specifically, when the transmission clutch is applied after the main transmission has been shifted by releasing the transmission clutch, whereupon the auxiliary transmission may be shifted down from the high-speed transmission line to the low-speed transmission line by subsequently depressing the accelerator pedal. This downshift is undesirable in view of a driving comfort and the ability to accelerate. Specifically, speed change shocks are caused by said downshift after the main transmission was shifted, or the acceleration is delayed by the time lag of said downshift. In order to obviate the speed change shocks or the acceleration delay, it is desired to prevent the high-speed transmission line from being established when the main transmission is shifted.

An object of the present invention is to provide a control device for preventing undesirable shifting in a vehicular transmission of the type in which an auxiliary transmission having high and low speed transmission lines is connected in series to a manual shift type main transmission connected to an engine through a transmission clutch such that the auxiliary transmission is automatically shifted in accordance with the throttle opening of said engine and the vehicle velocity, including a low-speed transmission holding means for holding said auxiliary transmission in said low-speed transmission line for a predetermined period after the transmission clutch has been applied.

The present invention will be described in connection with the embodiment thereof shown in the accompanying drawings, wherein.

Figure 1:
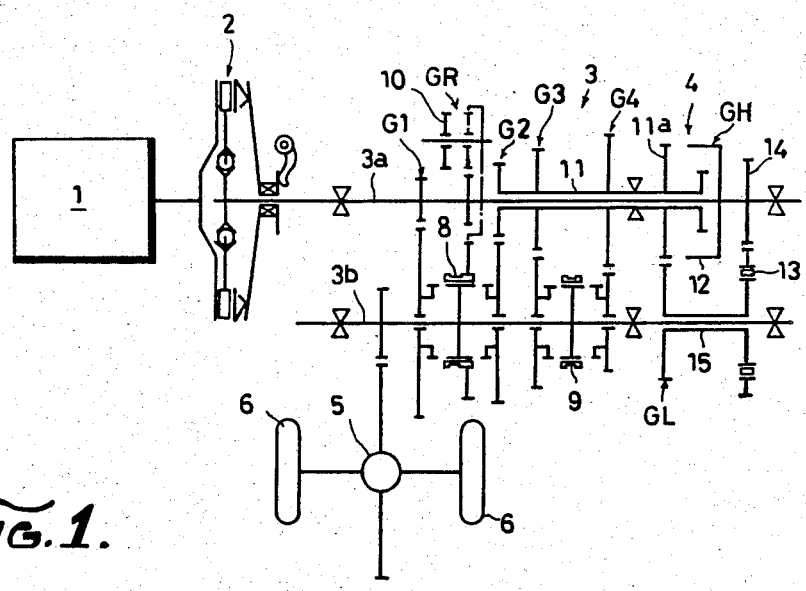
FIG. 1 is a diagrammatic view showing one example of the vehicular transmission to which the present invention is applied.

With reference to FIG. 1, reference numerals 1 and 2 indicate an engine and a transmission clutch, respectively. A main transmission 3 is connected to the engine 1 through the transmission clutch 2. An auxiliary transmission 4 is connected in series to the main transmission 3. The main and auxiliary transmissions 3 and 4 transmit the power of the engine 1 therethrough and through a differential gear 5 to drive wheels 6 of a vehicle, thus comprising a vehicular drive transmission system.

Figure 2:
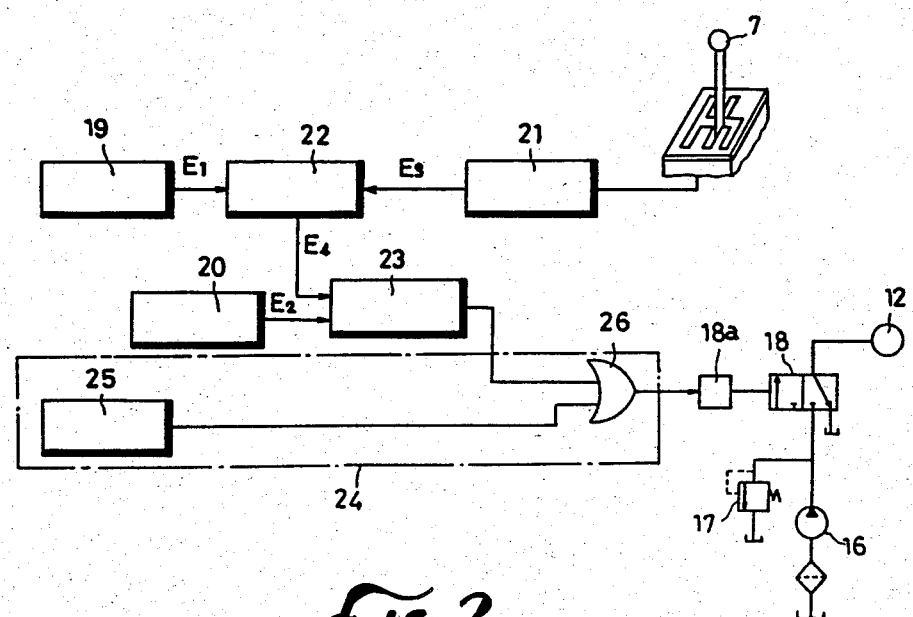
FIG. 2 is a diagrammatic view showing the automatic shift control circuit of the auxiliary transmission.

The main transmission 3 is arranged as a speed change gear mechanism with 1st to 4th speed forward gear trains G1, G2, G3 and G4 and a reverse gear train GR between an input shaft 3a leading to the transmission clutch 2 and an output shaft 3b leading to the differential gear 5. The main transmission 3 is a manual shift type four forward and one reverse drive transmission wherein those gear trains are selectively established by switching 1st–2nd and 3rd–4th speed changing first and second change-over clutches 8 and 9 and a reverse idle shift gear 10, all of which are operatively associated with a change lever 7 located in the operator's compartment, as shown in FIG. 2. The number of speed change ratios is increased by the inclusion of the auxiliary transmission 4, having high and low speed transmission lines GH and GL, which is connected to the input or output of said speed change gear mechanism.

More specifically, as shown, a sleeve shaft 11 at the input side of the speed change gear mechanism is borne on the input shaft 3a such that it is connected to the input shaft 3a through the auxiliary transmission 4. A hydraulic clutch 12 is provided in the high-speed transmission line GH whereas a one-way clutch 13 for allowing the overrun of the output side is provided in the low-speed transmission line GL so that the low-speed transmission line GL and the high-speed transmission line GH may be established when the hydraulic clutch 12 is released and applied, respectively. More specifically, the input shaft 3a is extended rearward to have its extension arranged with the hydraulic clutch 12 for connecting and disconnecting the sleeve shaft 11 and the input shaft 3a and with an associated gear 11a fixed on the sleeve shaft 11 and a fixed gear 14 fixed on the input shaft 3a while interposing the hydraulic clutch 12 therebetween. On the extension of the output shaft 3b, there is an idle gear mechanism 15 for connecting the two gears 11a and 14, and there is introduced into the idle gear mechanism 15 the one-way clutch 13 for allowing the overrun at the output side, i.e., at the side of the associated gear 11a. Thus, the high-speed transmission line GH is constructed to lead from the input shaft 3a via the hydraulic clutch 12 to the sleeve shaft 11, and the low-speed transmission line GL is constructed to lead from the input shaft 3a to the sleeve shaft 11 by way of the fixed gear 14, the idle gear mechanism 15 and the associated gear 11a. When the high-speed transmission line GH is established by applying the hydraulic clutch 12, the power transmission through the low-speed transmission line GL is interrupted by the action of the one-way clutch 13. In the shown construction, incidentally, the 1st speed gear train G1 and the reverse gear train GR are connected directly to the input shaft 3a, and 2nd, 3rd and 4th speed gear trains G2, G3 and G4 are connected to the sleeve shaft 11 to impart the respective high and low speed changes by the auxiliary transmission 4 so that a total of seven forward speeds and one reverse speed can be attained. It is, however, naturally possible to effect eight forward speeds and two reverse speeds by connecting the 1st speed gear train G1 and the reverse gear train GR to the sleeve 11.

The aforementioned hydraulic clutch 12 is applied or released, as shown in FIG. 2, by a change-over valve 18 disposed in an oil passage through which the pressurized oil is pumped from the oil pump 16 and has its pressure regulated by a regulator valve 17 for being introduced into the hydraulic clutch 12. In other words, the change-over valve 18 can be switched between an oil supply position, in which the pressurized oil supply is conducted to the hydraulic clutch 12 and an oil discharge position, in which the oil is discharged from the hydraulic clutch 12, so that the hydraulic clutch 12 is applied and released by switching the change-over valve 18 to the oil supply position and to the oil discharge position, respectively.

Figure 3:
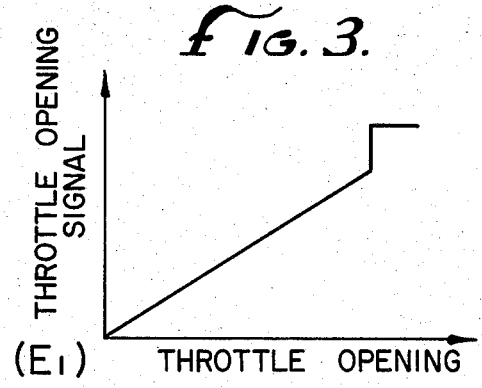
FIGS. 3 to 5 are graphs showing the signal characteristics of a throttle opening detector, a vehicle velocity detector and a ratio detector of the control circuit.
Figure 4:
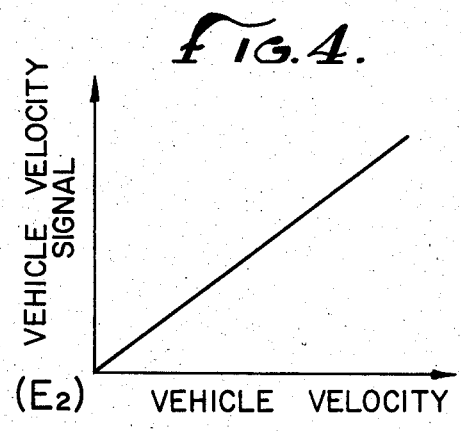
Figure 5:
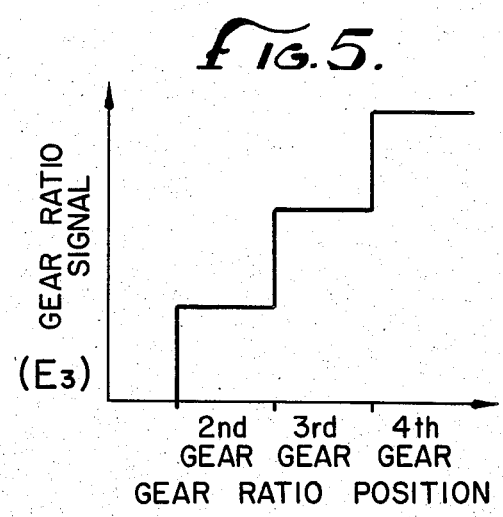
Figure 6:
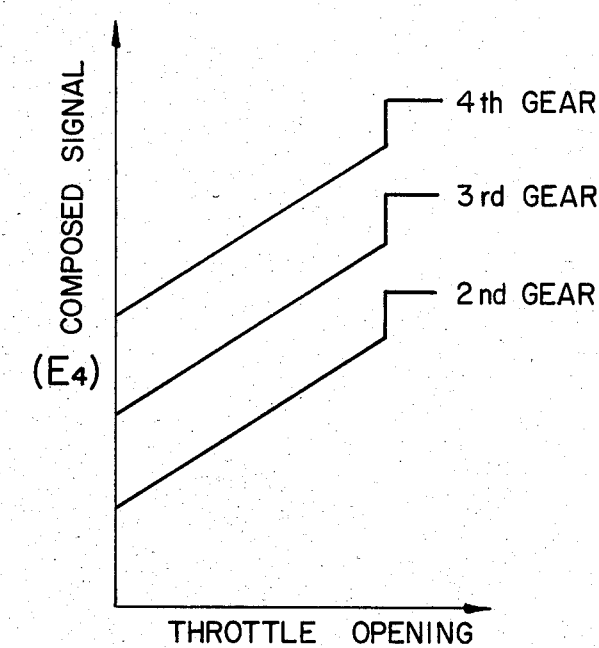
FIG. 6 is a graph showing the composed signals outputted from the arithmetic circuit of the control circuit.

In order to automatically shift the auxiliary transmission 4 in accordance with the throttle opening of the engine and the vehicle velocity and also in relation to the gear ratio of the main transmission 3, the change-over valve 18 is switched in the following manner. Specifically, there are provided: a throttle opening detector 19 for generating a throttle opening signal $E_1$ having a voltage level, as shown in FIG. 3, in accordance with the throttle opening of the engine 1; a vehicle velocity detector 20 for generating a vehicle velocity signal $E_2$ having a voltage level, as shown in FIG. 4, in accordance with the vehicle velocity; and a gear ratio detector 21 which is connected to the change lever 7 for generating a gear ratio signal $E_3$ having a stepwise voltage change, as shown in FIG. 5, in accordance with the individual gear ratios of the 2nd to 4th speeds connected to the auxiliary transmission. The throttle opening signal $E_1$ and the gear ratio signal $E_3$ are summed by an arithmetic circuit 22 to generate a composed signal $E_4$, as shown in FIG. 6. This composed signal $E_4$ is compared with the vehicle velocity signal $E_2$ by a comparator 23 to discriminate whether or not the voltage of the vehicle velocity signal $E_2$ is higher than that of the composed signal $E_4$ thereby generating a logic signal "0" or "1". When the vehicle velocity signal $E_2$ becomes higher so that the logic signal "0" is generated from the comparator 23 and inputted to an electromagnetic circuit 18a of the change-over valve 18, this change-over valve 18 is switched to the oil supply position to apply the hydraulic clutch 12. Thus, as shown in FIG. 7, in accordance with predetermined characteristic curves $X_2$, $X_3$ and $X_4$, (solid lines) the high-speed transmission line GH is established for each gear ratio at the higher speed regions.

In the shown construction, the comparator 23 has hysterisis characteristics so that the downshift from the high-speed transmission line GH to the low-speed transmission line GL may be effected at slightly lower speed sides than the aforementioned respective characteristic curves $X_2$, $X_3$ and $X_4$.

Figure 7:
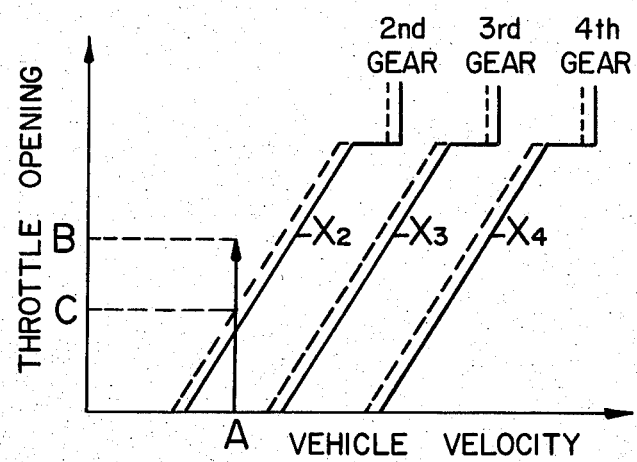
FIG. 7 is a graph showing the shift characteristics of the auxiliary transmission.

The control device according to the present invention is equipped with low-speed transmission holding means 24 which releases the control according to the characteristic curves of FIG. 7 and holds the auxiliary transmission 4 in the low-speed transmission line GL for a predetermined period after the transmission clutch 2 has been applied which period may be measured in time, engine revolutions, or any other convenient measurement. In the shown construction, more specifically, the holding means 24 is composed of: a clutch application detector 25 for detecting the application of the transmission clutch 2 from the stroke or the like of a clutch pedal located in the vehicular compartment; and an OR gate 26 introduced into the signal line between the comparator 23 and the electromagnetic circuit 18a. The detector 25 is adapted to output the logic signal "1" for a predetermined period from the instant the transmission clutch 2 is connected and the logic signal "0" for the remaining period while the transmission clutch 2 is being applied. These logic signals thus outputted are inputted to the OR gate 26.

Thus, according to this control, the logic signal "0" is normally inputted from the detector 25 to the OR gate 26. In this case, the logic signal generated from the comparator 23 and the logic signal inputted from the OR gate 26 to the electromagnetic circuit 18a become coincident so that the auxiliary transmission 4 is automatically shifted in accordance with the characteristic solid line curves of FIG. 7. On the other hand, if the transmission clutch 2 is once released and is applied again when the main transmission 3 is shifted, the logic signal "1" is inputted for a predetermined period from the detector 25 to the OR gate 26. In this case, the logic signal "1" is inputted from the OR gate 26 to the electromagnetic circuit 18a irrespective of the logic signal generated from the comparator 23 so that the change-over valve 18 is switched to and held at the oil discharge position, whereby the auxiliary transmission 4 is held at the low-speed transmission line.

Next, the operations in the actual drive will be described. For example, let the case be considered in which the 1st speed of the main transmission 3 is selected for acceleration so that the main transmission 3 is shifted up from the 1st speed to the 2nd speed at a vehicular speed, as indicated at A in FIG. 7. Upon this upshift, the gear change is first conducted in the state having the transmission clutch 2 released. At this instant, ordinarily the accelerator pedal is fully released. At the subsequent step when the transmission clutch 2 is applied, the accelerator pedal is released so that the throttle opening is in the vicinity of zero. In the control which does not have a low-speed transmission holding means 24 of the present invention, the auxiliary transmission 4 is in the state having the high-speed transmission line GH established, as seen from the characteristic curve $X_2$ of FIG. 7. When the accelerator pedal is then depressed to increase the throttle opening to a value, as indicated at B in FIG. 7, for a short period, the auxiliary transmission 4 is shifted down in the course of the depression from the high-speed transmission line GH to the low-speed transmission line GL so that the speed change shocks are caused by the downshift after the shift of the main transmission 3 and so that the acceleration is delayed by the time lag of the downshift. According to the present invention, however, the auxiliary transmission 4 is held at the low-speed transmission line GL irrespective of the driving state by the operation of the low-speed transmission holding means for the predetermined period after the transmission clutch 2 was applied. If the throttle opening is increased for the predetermined period to exceed a value, as indicated at C in FIG. 7, the auxiliary transmission 4 is held after that at the low-speed transmission line GL in accordance with the characteristic curves $X_2$ so that the aforementioned downshift does not occur.

Thus, according to the present invention, the auxiliary transmission is held at the low-speed transmission line by the low-speed transmission holding means for the predetermined period after the transmission clutch was applied. As a result, the downshift of the auxiliary transmission is not caused when the accelerator pedal is depressed immediately after the shift of the main transmission, and the low-speed transmission line is established in advance to prevent occurrence of the speed change shocks and delay of the acceleration due to the time lag of the downshift so that both the driving comfort and the acceleration can be improved.

The invention claimed is:

1. In a vehicular transmission of the type in which an auxiliary transmission having high and low-speed transmission lines and clutch means is connected in series to a manual shift type main transmission connected to an engine through a transmission clutch and in which said auxiliary transmission is automatically shifted in accordance with the throttle opening of said engine and the vehicle velocity, the improvement comprising, a control device having low-speed transmission holding means for holding said auxiliary transmission in said low-speed transmission line for a predetermined period after said transmission clutch has been applied, the control device including means for detecting actuation of the transmission clutch and initiating a signal in response thereto, and means for producing a signal to cause operation of the auxiliary transmission clutch means in response to the vehicle operating characteristics, and OR gate means for receiving both said signals from said detecting means and said auxiliary transmission clutch means.

2. In a vehicular transmission having an auxiliary transmission with high and low speed transmission lines and clutch means connected in series to a manual shift main transmission which in turn is connected to an engine through a transmission clutch and in which said auxiliary transmission is automatically shifted in accordance with the throttle opening of said engine and the vehicle velocity, the improvement comprising, a change-over valve for operating the auxiliary transmission clutch means, throttle opening and vehicle velocity detecting and signal producing means for operating said change-over valve, and control means for operating said change-over valve to maintain said auxiliary transmission in said low-speed transmission line for a predetermined period after application of the transmission clutch without regard to the signal produced by the detecting and signal producing means.

3. The improved transmission of claim 2 wherein said control means includes means for producing a signal for said predetermined period and an OR gate for receiving that control means signal and the first said signal for in turn causing the operation of said change-over valve.

* * * * *